United States Patent
Bustani et al.

(10) Patent No.: US 10,251,121 B2
(45) Date of Patent: Apr. 2, 2019

(54) APPARATUS, SYSTEM AND METHOD OF DETECTING ONE OR MORE ACTIVE WIRELESS COMMUNICATION CHANNELS

(71) Applicant: INTEL IP CORPORATION, Santa Clara, CA (US)

(72) Inventors: Oren Bustani, Petach Tikwa (IL); Gil Paryanti, Modiin (IL)

(73) Assignee: INTEL IP CORPORATION, Santa Clara, CA (US)

( * ) Notice: Subject to any disclaimer, the term of this patent is extended or adjusted under 35 U.S.C. 154(b) by 154 days.

(21) Appl. No.: 15/281,108

(22) Filed: Sep. 30, 2016

(65) Prior Publication Data

US 2018/0098270 A1 Apr. 5, 2018

(51) Int. Cl.
*H04W 48/16* (2009.01)
*H04W 24/08* (2009.01)
*H04W 72/12* (2009.01)

(52) U.S. Cl.
CPC ........... *H04W 48/16* (2013.01); *H04W 24/08* (2013.01); *H04W 72/1263* (2013.01)

(58) Field of Classification Search
CPC . H04W 24/08; H04W 48/16; H04W 72/1263; H04W 72/0446; H04B 7/2618
USPC ......................................................... 370/336
See application file for complete search history.

(56) References Cited

U.S. PATENT DOCUMENTS

| | | | | |
|---|---|---|---|---|
| 6,198,910 B1 * | 3/2001 | Hanley | ................. | H04W 28/16 455/67.11 |
| 9,166,710 B2 * | 10/2015 | Sega | .................... | H04B 17/327 |
| 2006/0189311 A1 | 8/2006 | Cromer et al. | | |
| 2007/0097940 A1 * | 5/2007 | Yuen | ..................... | H04W 16/10 370/338 |
| 2007/0258409 A1 * | 11/2007 | Alizadeh-Shabdiz | ....................... | H04W 64/006 370/331 |
| 2008/0095042 A1 * | 4/2008 | McHenry | .............. | H04W 16/14 370/217 |
| 2008/0159244 A1 * | 7/2008 | Hunziker | ................. | H04Q 9/00 370/338 |
| 2008/0240271 A1 | 10/2008 | Berens | | |
| 2009/0010366 A1 | 1/2009 | Wu et al. | | |

(Continued)

OTHER PUBLICATIONS

International Search Report and Written Opinion for PCT/US2017/049235, dated Dec. 5, 2017, 16 pages.

(Continued)

*Primary Examiner* — Robert J Lopata
(74) *Attorney, Agent, or Firm* — Shichrur & Co.

(57) ABSTRACT

Some demonstrative embodiments include apparatuses, devices, systems and methods of determining one or more active channels. For example, an apparatus may include an energy measurement component including circuitry to measure energy on a plurality of wireless communication frequency channels; a mapping component configured to determine a two-dimensional energy detection map of an Access Point (AP) scan, the two-dimensional energy detection map including a plurality of energy values mapped to a plurality of time slots and to the plurality of frequency channels; and an channel detector component configured to detect one or more active channels of the plurality of wireless communication frequency channels, based on the two-dimensional energy detection map.

24 Claims, 8 Drawing Sheets

(56) References Cited

U.S. PATENT DOCUMENTS

| | | | |
|---|---|---|---|
| 2010/0067463 A1* | 3/2010 | Masaoka | H04L 5/023 370/329 |
| 2010/0081449 A1* | 4/2010 | Chaudhri | H04W 72/082 455/452.2 |
| 2012/0064935 A1* | 3/2012 | Hakola | H04W 72/02 455/513 |
| 2012/0140658 A1* | 6/2012 | Kanzaki | H04B 7/0426 370/252 |
| 2013/0252553 A1* | 9/2013 | Hyon | H04W 16/14 455/41.2 |
| 2013/0308512 A1* | 11/2013 | Jeong | H04W 52/0225 370/311 |
| 2013/0337806 A1 | 12/2013 | Barash et al. | |
| 2014/0073369 A1* | 3/2014 | Senarath | H04W 52/226 455/509 |
| 2014/0274044 A1* | 9/2014 | Lee | H04W 48/16 455/434 |
| 2014/0314003 A1* | 10/2014 | Zhou | H04W 48/16 370/329 |
| 2015/0156723 A1 | 6/2015 | Locher | |
| 2015/0270925 A1* | 9/2015 | Lin | H04L 1/0015 370/329 |
| 2016/0262162 A1* | 9/2016 | Calin | H04W 74/002 |
| 2017/0041936 A1* | 2/2017 | Tarlazzi | H04B 17/318 |
| 2017/0064618 A1* | 3/2017 | Katar | H04W 48/16 |
| 2018/0083760 A1* | 3/2018 | Jia | H04L 27/0008 |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

* cited by examiner

APPARATUS, SYSTEM AND METHOD OF DETECTING ONE OR MORE ACTIVE WIRELESS COMMUNICATION CHANNELS

TECHNICAL FIELD

Embodiments described herein generally relate to detecting one or more active wireless communication channels.

BACKGROUND

A wireless communication device may perform a scan procedure, for example, a passive scan procedure or an active scan procedure, for example, to determine and/or map an existence of nearby access points (APs).

The wireless communication device may consider the nearby APs as candidates, for example, to establish a wireless communication link.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
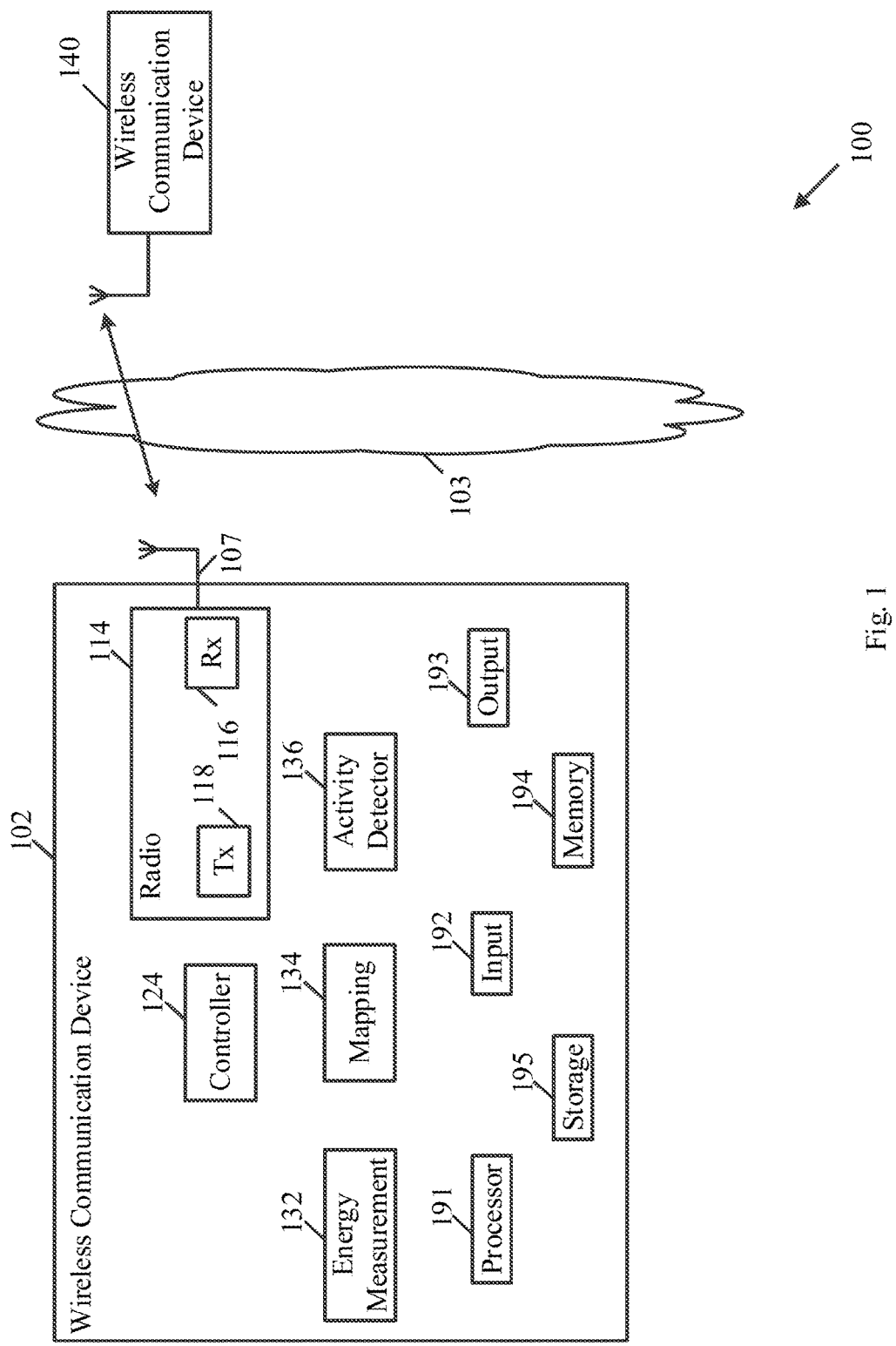
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications,* Mar. 29, 2012; *IEEE*802.11*ac*-2013 (*"IEEE P*802.11*ac*-2013, *IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); *IEEE* 802.11*ad* (*"IEEE P*802.11*ad*-2012, *IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY)*

Specifications—Amendment 3: Enhancements for Very High Throughput in the 60 GHz Band", 28 December, 2012); IEEE-802.11REVmc ("*IEEE 802.11-REVmc™/D6.0*, June 2016 *draft standard for Information technology—Telecommunications and information exchange between systems Local and metropolitan area networks Specific requirements; Part 11: Wireless LAN Medium Access Control (MAC) and Physical Layer (PHY) Specification*"); IEEE 802.11ax (*IEEE 802.11ax, High Efficiency WLAN (HEW)*); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*); and/or IEEE 802.11az (*IEEE 802.11az, Next Generation Positioning*)) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version 1.1*, April 2011, *Final specification*) and/or future versions and/or derivatives thereof, devices and/or networks operating in accordance with existing WiFi Alliance (WFA) Peer-to-Peer (P2P) specifications (including *WiFi P2P technical specification, version 1.5*, Aug. 4, 2014; and/or *Wi-Fi Neighbor Awareness Networking (NAN) Technical Specification, Version 1.0*, May 1, 2015) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 or 5 Gigahertz (GHz). However, other embodiments may be implemented utilizing any other suitable wireless communication frequency bands, for example, a 60 GHz band, a millimeterWave (mmWave) frequency band, a Sub 1 GHz (S1G) frequency band, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102 and/or one or more wireless communication devices 140.

In some demonstrative embodiments, device 102 may include a mobile device or a non-mobile, e.g., a static, device.

For example, device 102 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, device 102 may include and/or perform the functionality of one or more STAs. For example, device 102 may include at least one STA.

In one example, a station (STA) may include a logical entity that is a singly addressable instance of a medium access control (MAC) and physical layer (PHY) interface to the wireless medium (WM). The STA may perform any other additional or alternative functionality.

In other embodiments, device 102 may operate as and/or perform one or more functionalities of any other wireless device and/or station, e.g., a WLAN STA, a WiFi STA, and the like.

In some demonstrative embodiments, devices 140 may include an Access point (AP) STA.

In one example, an AP STA may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In other embodiments, device 102 may operate as, perform a role of, and/or perform one or more functionalities of, any other additional or alternative device and/or station.

In some demonstrative embodiments, wireless communication device 102 may be capable of communicating content, data, information and/or signals via a wireless medium (WM) 103, for example, with device 140. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, device 102 may include one or more radios including circuitry and/or logic to perform wireless communication between devices 102 and/or one or more other wireless communication devices. For example, device 102 may include at least one radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receivers 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 may include or may be implemented as part of a wireless Network Interface Card (NIC), and the like.

In some demonstrative embodiments, radio 114 may be configured to communicate over a 2.4 GHz band, a 5 GHz band, a directional band, for example, an mmWave band, a S1G band, a cellular band, an LTE band, and/or any other band.

In some demonstrative embodiments, radio 114 may include, or may be associated with, one or more antennas 107.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, Antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, Antennas 107 may include a phased array antenna, a multiple element antenna, a set of switched beam antennas, and/or the like. In some embodiments, Antennas 107 may implement transmit and receive functionalities using separate transmit and receive antenna elements. In some embodiments, Antennas 107 may implement transmit and receive functionalities using common and/or integrated transmit/receive elements.

In some demonstrative embodiments, device 102 may include a controller 124 configured to perform one or more communications, to generate and/or communicate one or more messages and/or transmissions, and/or to perform one or more functionalities, operations and/or procedures between device 102 and one or more other devices, e.g., as described below.

In some demonstrative embodiments, controller 124 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In some demonstrative embodiments, at least part of the functionality of controller 124 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, and/or one or more elements of radio 114. In one example, controller 124, and radio 114 may be implemented as part of the chip or SoC.

In other embodiments, controller 124 and/or radio 114 may be implemented by one or more additional or alternative elements of device 102.

In some demonstrative embodiments, device 102 may be configured to perform an AP scan, for example, a passive AP scan, e.g., a beacon scan process, for example, to identify and map existence of one or more APs, for example, one or more APs located nearby to device 102, e.g., on or more devices 140.

In some demonstrative embodiments, device 102 may perform the AP scan, for example, to detect one or more APs to be candidates to establish a wireless communication link with device 102.

In some demonstrative embodiments, an AP scan may include tracking of a plurality of wireless communication channels, e.g., tracking of all WiFi channels in a high-band (HB) frequency band and/or a low-band (LB) frequency band, for example, to detect existence of one or more APs.

In some demonstrative embodiments, the AP scan may be repeated more often, for example, if a number of usages and/or a number of potential WiFi networks increases.

In some demonstrative embodiments, it may be advantageous to minimize a duration of the AP scan and/or to optimize one or more detection metrics of the AP scan, for example, in order to reduce a power consumption for the AP scans.

For example, the AP scan may be performed during a sleep mode, e.g., an idle mode, of device 102, and therefore, activation of the AP scan may increase a power consumption of device 102, e.g., compared to the power consumption during the sleep mode.

In some demonstrative embodiments, a false detection of an AP during the AP scan, e.g., a false "detection" of a network and/or an AP which does not actually exist (a "false AP"), may increase a power consumption of device 102, e.g., if device 102 wakes up to associate with the false AP.

In some demonstrative embodiments, the false detection may occur for various reasons, including, for example, an energy leakage between channels, which may result from a non-ideal internal implantation of hardware and/or Software filtering, e.g., at one or more receiver components of device 102.

In some demonstrative embodiments, minimizing a number of false detections and/or the duration of the AP scan may allow, for example, at least to reduce the power consumption of device 102, e.g., during the sleep mode, which, in some cases, may even significantly affect a battery life of device 102.

In some demonstrative embodiments, performing an AP scan process only on channels suspected of being active channels ("the suspected channels") may not be efficient. For example, the scan process over the suspected channels may have a low detection performance, for example, due to an increased number of false detections, which may result in a longer scanning time duration, and/or may increase the power consumption of a device.

In one example, the scan process only on the suspected channels may be performed by measuring an average energy for each channel of the suspected channels, and setting thresholds on the measured average energy. A channel, in which a device is detected, may be assumed to include a potential AP, and an association may be established with the potential AP. For example, the scan process only on the suspected channels may be preformed concurrently over channels of an 80 MHz bandwidth, which may be partitioned into four portions of 20 MHz, each having a detection threshold.

In some demonstrative embodiments, an AP scan process using non-sharp frequency response filters in time-domain may result in an increased energy leakage, and a high rate of false detections, which may lead to an increased duration of the scan process and/or to an increased power consumption of a mobile device.

In some demonstrative embodiments, device 102 may be configured to implement an active scanning mechanism, which may be configured, for example, at least to solve a technical problem of reducing, e.g., minimizing, a number of false detections, and/or reducing, e.g., minimizing, the duration of the AP scan, for example, at least to improve the power consumption of device 102, e.g., as described below.

In some demonstrative embodiments, device 102 may be configured to identify events in which an AP may appear or disappear during the AP scan process, and to utilize information of these events, for example, to minimize the number of false detections, e.g., as described below.

In some demonstrative embodiments, device 102 may be configured to identify active channels and/or to reduce the number of false detections, for example, based on one or more energy patterns over a plurality of channels as a function of frequency and time, e.g., instead of, or even in addition to, measuring the average energy for each channel of the suspected channels, e.g., as described below.

In some demonstrative embodiments, device 102 may be configured to measure energy values on a plurality of channels, e.g., on each channel, in a time period, to store the measured energy values, and to repeat the process over the plurality of channels for several time periods, for example, to identify one or more active channels and/or to reduce the number of false detections, e.g., as described below.

In some demonstrative embodiments, device 102 may be configured to process the energy values on the plurality of channels over time, for example, to generate a two-dimensional (2D) energy detection map having time periods versus channels, and including energy values per a time period and per a channel, e.g., as described below.

In some demonstrative embodiments, device 102 may be configured to extract and analyze one or more energy patterns from the detection map, for example, by using one or more two-dimensional pattern recognition methods, e.g., as descried below.

In some demonstrative embodiments, device 102 may determine and/or identify the one or more active channels, for example, based on the analysis of the one or more energy patterns, e.g., as described below.

In some demonstrative embodiments, device 102 may be configured to measure energy over a plurality of channels over time, e.g., to build the detection map. For example, an energy on each 20 MHz WiFi channel may be measured, and the measurements of energy may be repeated one or more times, for example, based on an estimated Signal to Noise Ratio (SNR) and/or any other additional or alternative criteria, e.g., as described below.

In some demonstrative embodiments, device 102 may be configured to perform a time-mapping process, e.g., to determine the detection map. For example, measurements of energy during a time period on a channel may be assigned with a unique time stamp, which may enable to track changes in the energy, for example, per frequency over time, e.g., as described below.

In some demonstrative embodiments, device 102 may be configured to perform a pattern recognition analysis. For example, the pattern recognition analysis may include a set of algorithms to identify one or more energy patterns in the detection map. Each algorithm of the set of algorithms may be configured to identify a different scenario and/or event, and/or for a different goal and/or target, which may allow, for example, at least to improve performance of the detection scheme, e.g., as described below.

In some demonstrative embodiments, device 102 may include one or more components, which may be configured, for example, to enable device 102 to detect the one or more active channels, e.g., as described below.

In some demonstrative embodiments, device 102 may include an energy measurement component 132 including circuitry configured to measure energy on a plurality of wireless communication frequency channels, e.g., a plurality of WiFi channels and/or any other wireless communication channels of one or more wireless communication frequency bands.

In some demonstrative embodiments, the plurality of wireless communication frequency channels may include at least four 20 Megahertz (MHz) channels, e.g., four 20 MHz WiFi channels, and/or any other number of any other channels having any other channel bandwidth.

In one example, the energy measurement component 132 may perform the measurements of energy over the WiFi channels, e.g., as described below.

In some demonstrative embodiments, device 102 may include a mapping component 134, which may be configured to determine a two-dimensional (2D) energy detection map of an AP scan, e.g., a passive Access Point (AP) scan, for example, based on the energy measurements of energy measurement component 132, e.g., as described below.

In some demonstrative embodiments, one or more elements of mapping component 136 may be included as part of, and/or may be implemented by, controller 124.

In some demonstrative embodiments, one or more elements of mapping component 136 may be included as separate elements of device 102.

In some demonstrative embodiments, the two-dimensional energy detection map may include a plurality of energy values mapped to a plurality of time slots and to the plurality of frequency channels, e.g., as described below.

In some demonstrative embodiments, an energy value, which is mapped to a frequency channel and a time slot, may be based on energy measured by the energy measurement component 132 over the frequency channel during the time slot, e.g., as described below.

In one example, mapping component 134 may determine the two-dimensional energy detection map, for example, according to a time-mapping process, e.g., as described above.

In some demonstrative embodiments, device 102 may include a channel detector component 136 (also referred to as "activity detector component") configured to detect one or more active channels of the plurality of wireless communication frequency channels, for example, based on the two-dimensional energy detection map, e.g., as described below.

In some demonstrative embodiments, one or more elements of channel detector component 136 may be included as part of, and/or may be implemented by, controller 124.

In some demonstrative embodiments, one or more elements of channel detector component 136 may be included as separate elements of device 102.

In one example, channel detector component 136 may perform the pattern recognition analysis, and may implement one or more pattern recognition algorithms to determine one or more energy patterns, e.g., as described below.

In some demonstrative embodiments, channel detector component 136 may be configured to detect one or more energy patterns of one or more respective APs, e.g., one or more devices 140, for example, based on the two-dimensional energy detection map, e.g., as described below.

In some demonstrative embodiments, the one or more energy patterns may include one or more two-dimensional energy patterns having a time dimension and an energy dimension.

In some demonstrative embodiments, channel detector component 136 may be configured to determine one or more active channels of the plurality of wireless communication channels, for example, based on the one or more energy patterns, e.g., as described below.

In some demonstrative embodiments, channel detector component 136 may be configured to detect one or more energy patterns, for example, based on a filter pattern of a filter leakage between two or more adjacent frequency channels, e.g., as described below with reference to FIG. 4.

In some demonstrative embodiments, the one or more energy patterns may include at least a filter leakage pattern including active energy on an active channel, and/or leakage energy on one or more channels adjacent to the active channel during a same time slot, e.g., as described below with reference to FIG. 4.

In some demonstrative embodiments, activity detector component 136 may be configured to detect an energy pattern including two or more energy values, which are mapped to two or more respective frequency channels and to a same time slot, e.g., as described below with reference to FIG. 4.

In some demonstrative embodiments, activity detector component 136 may be configured to detect a highest energy value of the two or more energy values, and to determine an active channel including a channel to which the highest energy value is mapped, e.g., as described below with reference to FIG. 4.

In some demonstrative embodiments, activity detector component 136 may be configured to detect an energy pattern including two or more energy values, which are mapped to two or more respective time slots and to a same frequency channel, e.g., as described below.

In some demonstrative embodiments, activity detector component 136 may be configured to detect a first energy pattern, and to detect at least one second energy pattern, which partially overlaps with the first energy pattern, for example, by filtering out the first energy pattern from the two-dimensional energy detection map, e.g., as described below with reference to FIG. 5.

In some demonstrative embodiments, activity detector component 136 may be configured to determine whether an AP may be no more active, for example, based on a timing of an active time slot in an energy pattern corresponding to the AP, e.g., as described below.

In some demonstrative embodiments, activity detector component 136 may be configured to trigger an AP association to associate device 102 with an AP over at least one active channel of the one or more active channels.

In some demonstrative embodiments, activity detector component 136 may implement one or more energy patter detection algorithms, for example, a set of algorithms, which may be configured to identify the one or more energy patterns, for example, based on one or more detection, use cases, scenarios, and/or implementations, e.g., as described below. In other embodiments, one or more additional or alternative energy pattern detection algorithms may be implemented.

In some demonstrative embodiments, the energy pattern detection algorithms may include one or more algorithms, which may be configured, for example, to differentiate between two energy values in two adjacent channels being a result of an internal filter leakage at device 102, or being a result of energy of two transmissions of two respective APs, which may be transmitting over the two adjacent channels, e.g., during one or more at least partially overlapping time periods.

In some demonstrative embodiments, an internal filter leakage at device 102 may be, for example, a result of a Hardware (HW) and/or Software (SW) internal implementation of one or more components of device 102. For example, the internal leakage may have one or more known or predefined characteristics. In one example, the internal leakage may appear in a known frequency offset, and/or a known energy bias, e.g., compared to a detected channel.

In some demonstrative embodiments, energy values of transmissions from two APs may have different energy patterns and/or different time profiles, e.g., in contrast to the known profile of the internal leakage.

In some demonstrative embodiments, an unchanging energy pattern between two adjacent channels, e.g., a pattern that is highly correlated between the two adjacent channels, may be identified as filter leakage.

In some demonstrative embodiments, a changing energy pattern, e.g., in time or energy values, may be identified as energy of transmissions from at least two different APS, e.g., even though appearing close to the AP energy.

In some demonstrative embodiments, the energy pattern detection algorithms may include one or more algorithms, which may be configured, for example, to identify one or more APs, which are not active during one or more time periods, for example, at the end of the AP scan process, e.g., as described below.

In one example, one or more APs, which may be active at the start of the AP scan and may not be active at the end of the AP scan, may leave an energy trace over a frequency channel. According to this example, identifying the one or more APs, e.g., by analyzing the timing of the active time, may enable to avoid establishing an association with the one or more APs, e.g., when these APs become non-active.

In some demonstrative embodiments, the energy pattern detection algorithms may include one or more algorithms, which may be configured, for example, to identify a separation between at least first and second APs, e.g., as described below.

In one example, an energy pattern detection algorithm may be configured to identify two or more APs, for example, when a detected pattern does not correspond to a pattern of a single AP, for example, even if energy values of the two or more APs are synchronized, e.g., as described below.

In some demonstrative embodiments, channel detector component 136 may be configured to perform one or more operations of at least a first energy pattern detection algorithm, a second energy pattern detection algorithm, and/or a third energy pattern detection algorithm, for example, to identify the energy patterns, e.g., as described below.

In other embodiments, channel detector component 136 may implement any other additional or alternative energy pattern detection algorithm, for example, to identify the energy patterns.

In some demonstrative embodiments, the detected energy patterns may be a result of a level of a received signal and/or a filter behavior of SW and/or HW filters of device 102. A leakage of the SW and/or HW filters and/or a non-ideal filtering of the SW and/or HW filters may be a deterministic property of the SW and/or HW filters, which may be characterized, e.g., per a bandwidth and/or a power of a signal.

In some demonstrative embodiments, device 102 may be configured to identify dynamic changes in a spectrum profile of energy patterns, and to utilize dynamic changes, for example, to determine the one or more active channels based on the energy patterns, for example, instead of, or in addition to, identifying an average or a static spectrum behavior, e.g., which may not provide observability to dynamic changes. For example, a first detection, e.g., a false detection, of an active channel, which may be caused by a non-optimal filtering, may not be distinguished from a second detection, e.g., a real detection of an active channel, which be caused by another AP, for example, since it may be difficult do distinguish between the first and second detections, e.g., due to a difficulty in understanding signal statistics.

In some demonstrative embodiments, a first energy pattern detection algorithm may be configured to identify a leakage energy, e.g., due to imperfections in the HW and/or software implementation of filtering.

In some demonstrative embodiments, the first energy pattern detection algorithm may enable, for example, at least to reduce false detections, e.g., due to implementation of filtering.

In one example, a pattern, which is highly correlated between two adjacent channels, may be identified as a leakage energy, for example, since the leakage energy may usually appear in the known frequency offset and the energy bias, e.g., compared to a detected channel, e.g., as described above.

In some demonstrative embodiments, activity detector component 136 may perform the first energy pattern detection algorithm, for example, based on an input matrix parameter, denoted FreqTimeMat, including an m×n matrix, e.g., including n columns per the plurality of channels, and m rows for the time slot of each channel, representing a start time of the time slot. For example, a matrix entry may include an energy value measured on each channel during the time slot.

In some demonstrative embodiments, activity detector component 136 may perform the first energy pattern detection algorithm, for example, based on a vector parameter, denoted FilterPattern, including a vector of a width of the plurality of channels, e.g., 3 or 5 channels, representing a leakage energy value, e.g., in dB, of an expected leakage energy, e.g., due to a filter characteristic.

In some demonstrative embodiments, activity detector component 136 may perform the first energy pattern detection algorithm, for example, based on a value parameter, denoted CorrelationTH, including a value, which determines whether a correlation was identified for example, between an energy value and a leakage energy value, e.g., as part of an integration.

In some demonstrative embodiments, channel detector component 136 may perform the first energy pattern detection algorithm, for example, to determine a vector, denoted FreqTimeAPVec, e.g., of a vector size n per scanned channels. For example, an entry in the vector FreqTimeAPVec may include an indication on whether an AP is detected or not, and/or an indication of how many times the AP was identified.

In some demonstrative embodiments, one or more operations of the first energy pattern detection algorithm may include and/or be implemented, for example, according to the following pseudo code:

```
(FreqTimeAPVec)=DifferentialFilterLeakage(FreqTimeMat,FilterPattern,
CorrelationTH)
{
    For i=1:Rows,
        For                                         j=1:Colums,
            CorrelationVal=FreqTimeMat(i,j).*FilterPattern;
            If CorrelationVal > CorrelationTH,
                FreqTimeAPVec (j)+=1;
        end
    end
}
```

In some demonstrative embodiments, the second energy pattern detection algorithm may be configured to identify one or more APs having a low power energy, which may be masked by a leakage energy, e.g., from an AP having a higher power energy.

In some demonstrative embodiments, the second energy pattern detection algorithm may enable, for example, at least to reduce false detections, e.g., due to the leakage energy.

In one example, a leakage energy of a transmission from a first AP having a high power energy, e.g., an AP located close to device 102, may mask a transmission from a second AP having a lower power energy, e.g., an AP located far from the device 102. According to this example, energy of the transmission of the first AP and the energy of the energy leakage of the transmission from the first AP may be subtracted from an input matrix, and a search for the second AP may be repeated, e.g., using a lower energy threshold.

In some demonstrative embodiments, activity detector component 136 may perform the first energy pattern detection algorithm, for example, based on the matrix parameter FreqTimeMat, e.g., as described above.

In some demonstrative embodiments, activity detector component 136 may perform the first energy pattern detection algorithm, for example, based on the vector parameter FilterPattern, e.g., as described above.

In some demonstrative embodiments, activity detector component 136 may perform the first energy pattern detection algorithm, for example, based on at least one value parameter, e.g., a first value parameter, denoted CorrelationTH_High, and/or a second value parameter, denoted CorrelationTH_Low. For example, the value parameter CorrelationTH_High may represent that a high power AP is identified, and the value parameter CorrelationTH_Low may identify a low power AP.

In some demonstrative embodiments, activity detector component 136 may perform the second energy pattern detection algorithm, for example, to determine a vector, denoted FreqTimeAPVec, e.g., of a vector size n per scanned channels. For example, an entry in the vector FreqTimeAPVec may include an indication on whether an AP is detected or not, and/or an indication of how many times the AP was identified.

In some demonstrative embodiments, one or more operations of the second energy pattern detection algorithm may include and/or be implemented, for example, according to the following pseudo code:

```
FreqTimeAPVec)=FindLowPowerAPs(FreqTimeMat,FilterPattern,
Correlation TH_high, CorrelationTH_Low)
{
    Int TempFreqTimeMat
    For i=1:Rows,
        For                                        j=1:Colums,
            CorrelationVal=FreqTimeMat(i,j).*FilterPattern;
            If CorrelationVal > CorrelationTH_High,
                TempFreqTimeMat (I,j)+= FilterPattern;
            end
    end
    TempFreqTimeMat= FreqTimeMat– TempFreqTimeMat;
    For i=1:Rows,
        For                                        j=1:Colums,
            CorrelationVal= TempFreqTimeMat (i,j).*FilterPattern;
            If CorrelationVal > CorrelationTH_Low,
                FreqTimeAPVec (j)+= 1;
            end
    end
}
```

In some demonstrative embodiments, the third energy pattern detection algorithm may be configured to identify one or more APs, which are not active, e.g., at the end of the AP scan process.

In some demonstrative embodiments, the third energy pattern detection algorithm may enable, for example, at least to reduce false detections, e.g., of the APs, which are not active at the end of the scan process.

In one example, the third energy pattern detection algorithm may determine a reference value, which indicates a latest time slot in which an AP was identified. According to this example, the AP may be assumed to be not active, for example, if the reference value is lower than a latest time sweep.

In some demonstrative embodiments, activity detector component 136 may perform the first energy pattern detection algorithm, for example, based on the matrix parameter FreqTimeMat, e.g., as described above.

In some demonstrative embodiments, activity detector component 136 may perform the first energy pattern detection algorithm, for example, based on the vector parameter FilterPattern, e.g., as described above.

In some demonstrative embodiments, activity detector component 136 may perform the first energy pattern detection algorithm, for example, based on the value parameters CorrelationTH_High and/or CorrelationTH_Low, e.g., as described above.

In some demonstrative embodiments, activity detector component 136 may perform the third energy pattern detection algorithm, for example, to determine a vector, denoted FreqTimeAPVec, e.g., of a vector size n per scanned channels. For example, an entry in the vector FreqTimeAPVec may include an indication on whether an AP is detected or not, and/or an indication of how many times the AP was identified.

In some demonstrative embodiments, one or more operations of the third energy pattern detection algorithm may include and/or be implemented, for example, according to the following pseudo code:

```
(FreqTimeAPVec)=IdentifyNonTransmitAPs(FreqTimeMat,FilterPattern,
CorrelationTH)
{
    For i=1:Rows,
        For                                        j=1:Colums,
            CorrelationVal= TempFreqTimeMat (i,j).*FilterPattern;
            If CorrelationVal > CorrelationTH,
                FreqTimeAPVec (j)= i;
        end
    end
    For                                            j=1:Colums,
        if                              FreqTimAPVec(j)<Rows,
            FreqTimAPVec(j)=0;
    end
}
```

In some demonstrative embodiments, device 102 may be configured to identify active channels, for example, based on the one or more energy patterns, for example, using the one or more energy pattern detection algorithms, e.g., as described below.

Figure 2:
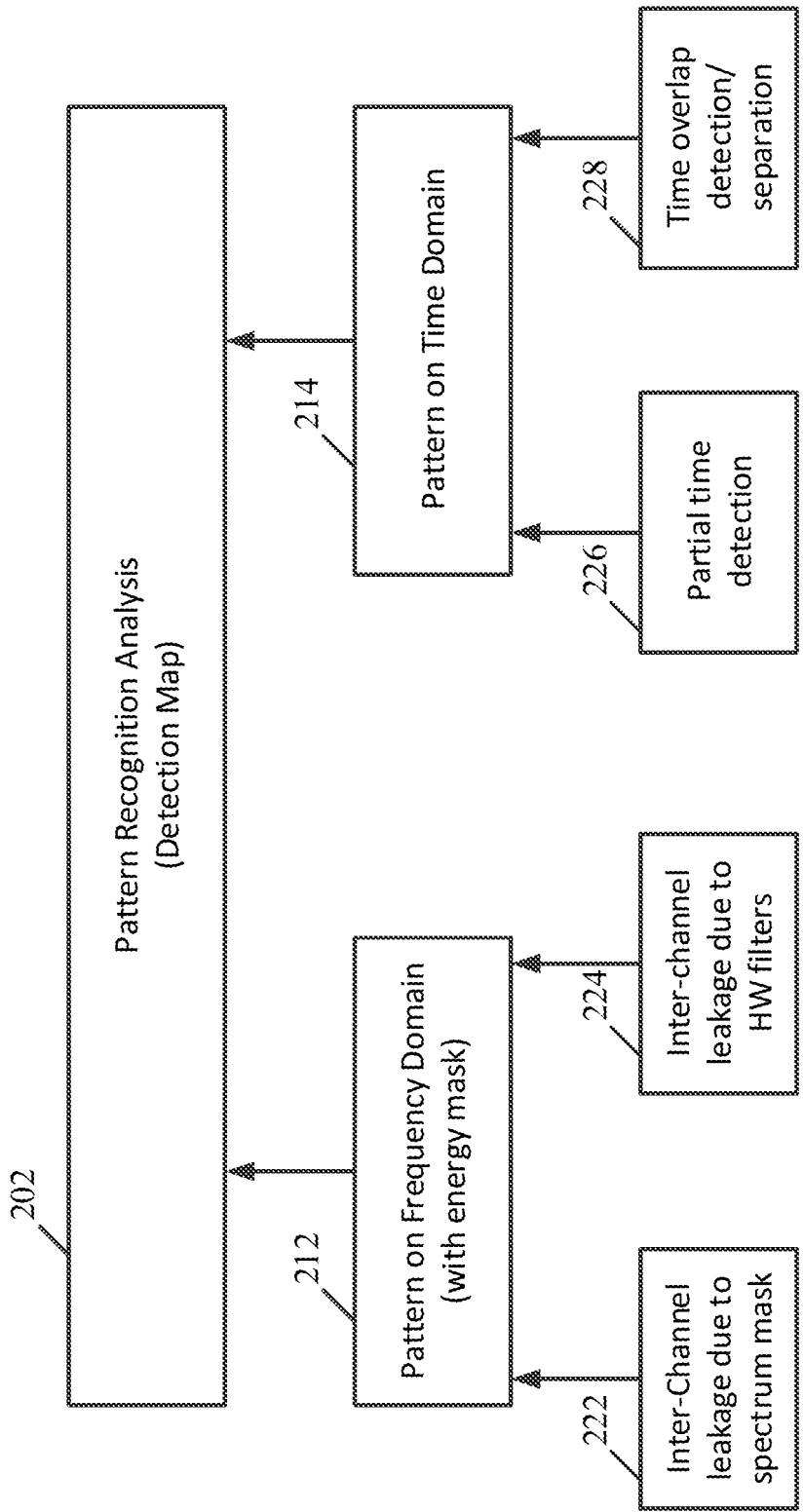
FIG. 2 is a schematic block diagram illustration of a pattern recognition analysis scheme, in accordance with some demonstrative embodiments.

Reference is made to FIG. 2, which schematically illustrates a pattern recognition analysis scheme 200, in accordance with some demonstrative embodiments.

In some demonstrative embodiments, activity detector 136 (FIG. 1) may implement one or more operations and/or functionalities according to pattern recognition analysis scheme 200.

In some demonstrative embodiments, as shown in FIG. 2, pattern recognition analysis scheme 200 may include a pattern recognition module 202 configured to determine one or more energy patterns. For example, pattern recognition module 202 may perform the functionality of activity detector 136 (FIG. 1).

In some demonstrative embodiments, as shown in FIG. 2, pattern recognition module 202 may receive inputs from a frequency-domain pattern recognition module 212 and/or a time-domain pattern recognition module 214.

In some demonstrative embodiments, as shown in FIG. 2, frequency-domain pattern recognition module 212 may include a first module 222 to determine an inter-channel leakage, e.g., as a result of a spectrum mask.

In some demonstrative embodiments, as shown in FIG. 2, frequency-domain pattern recognition module 212 may include a second module 224 to determine an inter-channel leakage, e.g., as a result of the implementation of filtering.

In some demonstrative embodiments, as shown in FIG. 2, time-domain pattern recognition module 214 may include a first module 226 to determine a partial time detection, e.g., to detect partial activity of an AP.

In some demonstrative embodiments, as shown in FIG. 2, time-domain pattern recognition module 214 may include a second module 228 to determine a time overlap and/or separation, e.g., between two energy values in two respective time slots.

In some demonstrative embodiments, as shown in FIG. 2, pattern recognition analysis scheme 200 may utilize two dimensions, e.g., a time dimension and a frequency dimension, for pattern recognition analysis.

In some demonstrative embodiments, frequency-domain pattern recognition module 212 may filter false detections, for example, according to a predefined pattern, e.g., a pattern of energy across adjacent channels.

In one example, a first energy pattern, which may be extracted from a wireless channel having a highest energy value may be compared to a second energy value, which may be extracted from an adjacent channel, which may be adjacent to the wireless channel having the highest energy value. According to this example, the second energy value may be considered as leakage energy and may be rejected, for example, if there is a correlation between the first and second energy values. If there is no correlation between the first and second energy values, a first option may be to avoid filtering of the second energy value, e.g., to avoid a miss detection of an AP, and a second option may be to use information from time-domain pattern recognition module 214, for example, to separate between two APs, e.g., since beacons of the two APs may not necessary be synchronized in time.

In some demonstrative embodiments, time-domain pattern recognition module 214 may remove a highest detected energy value from the two dimensional energy detection map and any leakage energy of the highest detected energy value, and may repeat performing pattern recognition analysis, for example, with respect to a next strongest energy pattern.

Figure 3:
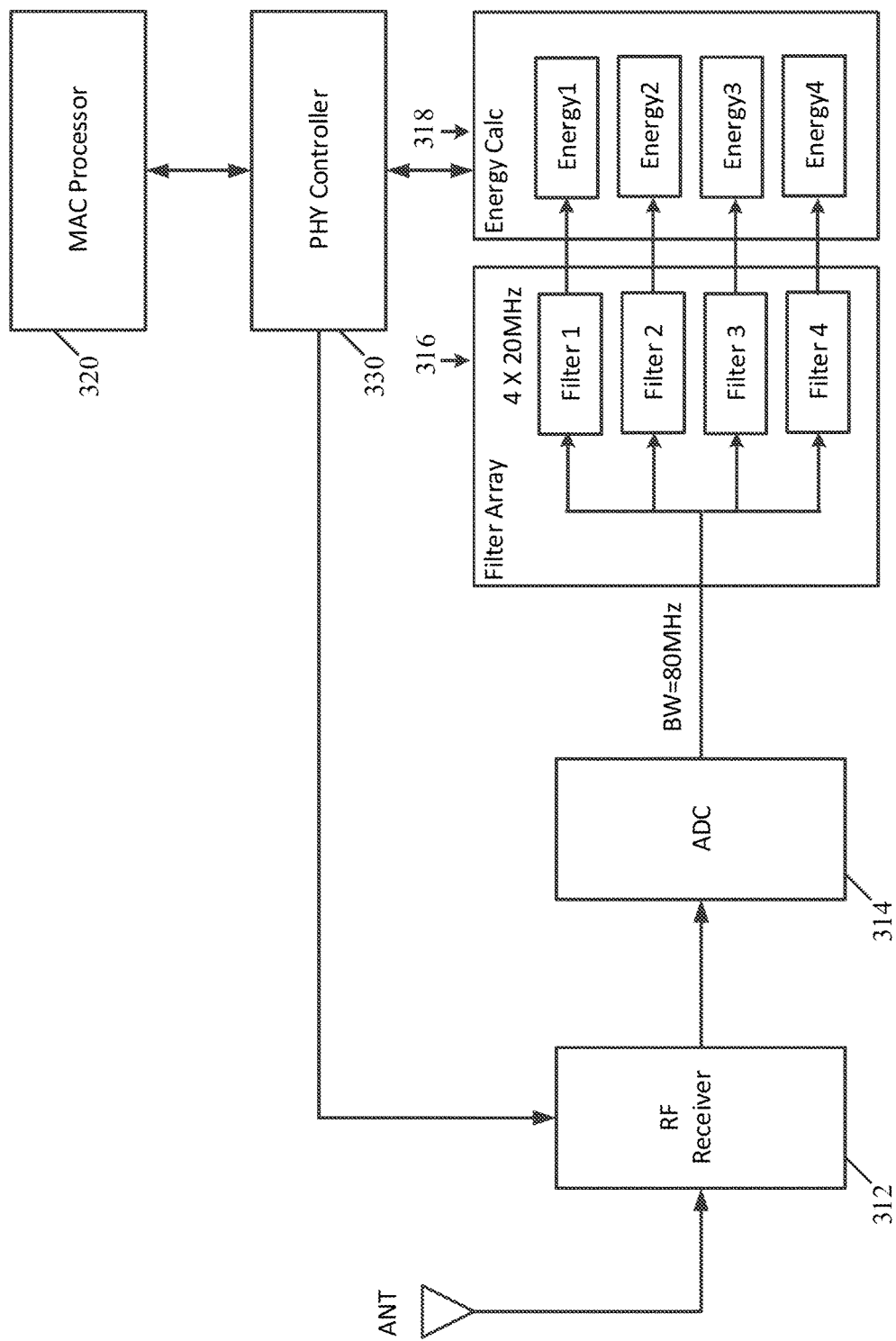
FIG. 3 is a schematic block diagram illustration of components to detect one or more active channels, in accordance with some demonstrative embodiments.

Reference is made to FIG. 3, which schematically illustrates an architecture 300 configured for detection of one or more energy patterns over one or more active channels, in accordance with some demonstrative embodiments.

In some demonstrative embodiments, an RF receiver 312 may be configured to receive energy via a wireless medium. For example, receiver 312 may perform the functionality of receiver 116 (FIG. 1).

In some demonstrative embodiments, as shown in FIG. 3, an Analog to Digital Converter (ADC) 314 may convert analog signals of RF receiver 312 into digital signals.

In some demonstrative embodiments, as shown in FIG. 3, a filter array including a plurality of filters 316 corresponding to a plurality of wireless communication frequency channels, e.g., each of 20 Mhz, may filer the energy corresponding to the four frequency channels.

In some demonstrative embodiments, as shown in FIG. 3, a plurality of energy measurement components 318 may be configured to measure energy over the plurality of wireless communication frequency channels. For example, measurement components 318 may perform the functionality of energy measurement component 132 (FIG. 1).

In some demonstrative embodiments, as shown in FIG. 3, a PHY controller 330 and/or a MAC processor 320 may be configured to control one or more operations of active channel detection.

In one example, one or more elements of mapping component 134 (FIG. 1) may be implemented by PHY controller 330.

In one example, one or more elements of activity detector 136 (FIG. 1) may be implemented by MAC processor 320.

Figure 4:
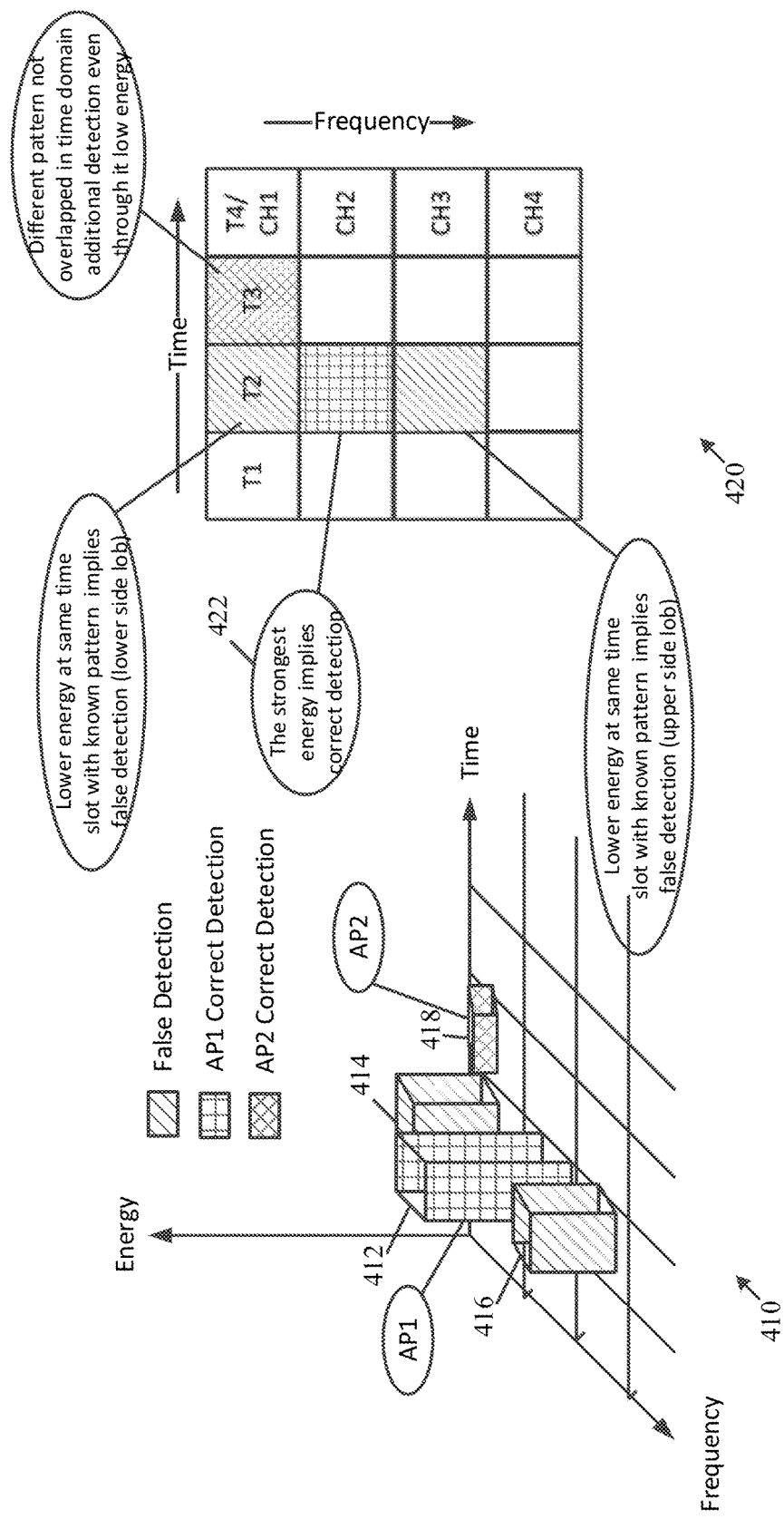
FIG. 4 is a schematic block diagram illustration of a detection scenario of active channels, in accordance with some demonstrative embodiments.

Reference is made to FIG. 4, which schematically illustrates a detection scenario 400 of one or more active channels, in accordance with some demonstrative embodiments.

In some demonstrative embodiments, as shown in FIG. 4, detection of one or more energy pasterns may be based on a three dimensional (3D) matrix 410 depicting time slots versus frequency channels versus energy values, and/or a two dimensional (2D) energy detection map 420 to map the energy values to time slots and frequency channels.

In some demonstrative embodiments, as shown in FIG. 4, scenario 400 may describe a scenario in which a first transmission from a first AP, denoted AP1, and a second transmission from a second AP, denoted AP2, are not overlapped in time. For example, the transmission from AP1, may occur only in one time slot, denoted T2, and the transmission from AP2, may occur only in one different time slot, denoted T3.

In some demonstrative embodiments, according to scenario 400, a correct detection may report and/or detect a first channel, denoted CH1, as an active channel for AP2, and second channel, denoted CH2, as an active channel for AP1, and may filter out a third channel, denoted CH3, as not having AP activity.

In some demonstrative embodiments, patterns of energy of the first transmission and the second transmission may be known, which may enable to filter the false detections.

In some demonstrative embodiments, as shown in FIG. 4, an energy value 412, e.g., the highest energy value, may be used, for example, to provide a correct detection (422) of an active channel of AP1, and/or to filter out false detections of energy, for example, based on an energy pattern 420, e.g., as described below.

In some demonstrative embodiments, as shown in FIG. 4, an energy value 414, which may be in an adjacent frequency to the frequency of energy value 412, and at the same time slot, may imply a leakage energy of the transmission from AP1, for example, a lower side lob resulting from energy 412.

In some demonstrative embodiments, as shown in FIG. 4, an energy value 416, which may be in an adjacent frequency to the frequency of energy value 412 and at the same time slot, may imply a leakage energy of the transmission from AP1, for example, an upper side lob resulting from energy 412.

In some demonstrative embodiments, as shown in FIG. 4, an energy value 418, which may be on a different time slot and may have a different energy value, e.g., from the energy value 412, may imply an active channel of another AP, e.g., AP2.

In some demonstrative embodiments, an additional detection of energy value 418 may be performed, e.g., using a lower energy threshold, for example, even though energy value 418 may have a lower energy value, for example, since the channel CH1 is an active channel of AP2.

Figure 5:
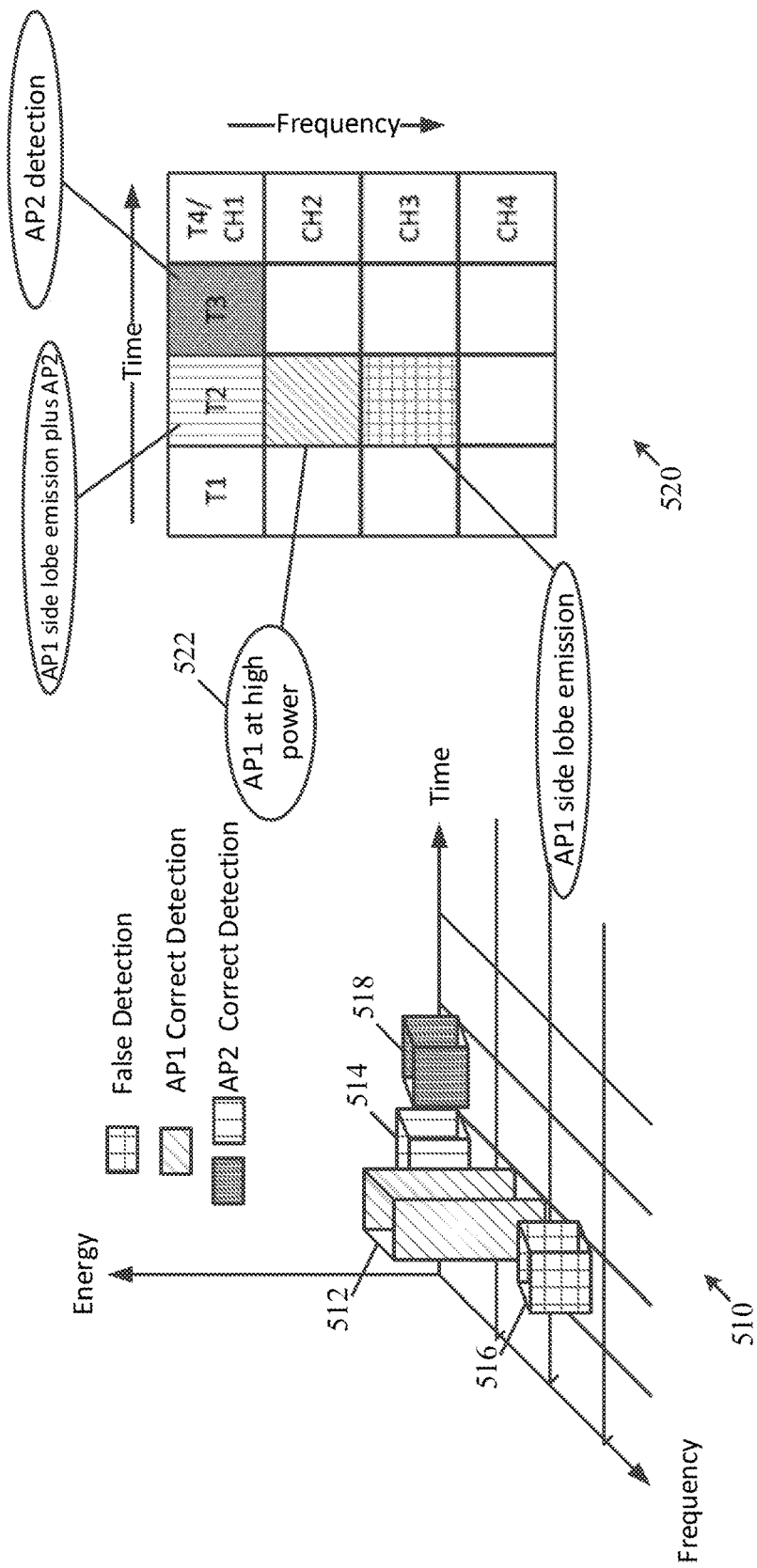
FIG. 5 is a schematic block diagram illustration of a detection scenario of active channels, in accordance with some demonstrative embodiments.

Reference is made to FIG. 5, which schematically illustrates a detection scenario 500 of active channels, in accordance with some demonstrative embodiments.

In some demonstrative embodiments, as shown in FIG. 5, detection of one or more energy pasterns may be based on a 3D matrix 510 depicting time slots versus frequency channels versus energy values, and/or a 2D energy detection map 520 to map the energy values to time slots and frequency channels.

In some demonstrative embodiments, as shown in FIG. 5, scenario 500 may describe a scenario in which a first transmission from a first AP, denoted AP1, and a second transmission from a second AP, denoted AP2, are partially overlapped in time. For example, the second transmission may have a longer duration than the first transmissions, e.g., as described below.

In some demonstrative embodiments, as shown in FIG. 5, a first energy value of a first transmission from AP1 may appear in one time slot, denoted T2, and a second energy value of a second transmission from AP2 may appear in two adjacent time slots, e.g., T2 and T3, for example, since the transmission from AP2 has a longer duration.

In some demonstrative embodiments, according to scenario 500, a correct detection may report and/or detect a first channel, denoted CH1, as an active channel for AP2, and a second channel, denoted CH2, as an active channel for AP1, and/or may filter out a third channel, denoted CH3.

In some demonstrative embodiments, as shown in FIG. 5, an energy value 512, having the highest energy value, may include an energy of AP1 and may be used to determine an active channel of AP1.

In some demonstrative embodiments, as shown in FIG. 5, an energy value 516, which may be in an adjacent frequency to energy value 512 and at the same time slot, may include a leakage energy of the transmission of AP1, e.g., an upper side lob resulting from energy 512.

In some demonstrative embodiments, as shown in FIG. 5, an energy value 514, which may be in an adjacent frequency to energy value 512 and at the same time slot, may include a combination of an energy of AP2 and a leakage energy of the transmission of AP1, e.g., a lower side lob resulting from energy 512.

In some demonstrative embodiments, as shown in FIG. 5, an energy value 518, which may be in the same frequency as energy value 514 and at an adjacent time slot, may imply an active channel of AP2, e.g., on the channel CH1.

In some demonstrative embodiments, patterns of the first energy and the second energy may be known, which may enable to filter false detections, e.g., as described below.

In some demonstrative embodiments, even though AP2 transmits during the same time as AP1, the transmission of AP2 may be identified, for example, based on the transmission of AP2 at T3.

For example, energy value 518 may be used, for example, to determine a correct detection (522) of the active channel of AP1, and/or to filter false detections of energy, for example, based on a comparison between an energy pattern of energy value 512 and an energy pattern of energy value 518, e.g., as described below.

In some demonstrative embodiments, even if AP2 always transmits at the same time with AP1, energy value 512 may not be fully correlated with energy value 514.

In some demonstrative embodiments, a sufficient difference between energy value 512 and energy value 514 may indicate an additional AP on the channel CH1, e.g., if the difference is greater than a full correlation difference.

In some demonstrative embodiments, energy values 514 and 516 may be use to determine, for example, if energy values 514 and 516 result from a single AP or two APs, for example, if the span of energy across channels of the single AP is known.

In one example, a detected pattern, e.g., energy pattern of energy value 514, may not be as expected for a single AP, e.g., if the two APs are synchronized in time and overlapped over channels. According to this example, no filtering may be applied to energy value 514, e.g., since it may be difficult to separate energy of the two APs in the time domain, e.g., assuming a full synchronization between the two APs, it may be complicated to estimate an expected pattern of more than a single AP.

In some demonstrative embodiments, separation and/or detection of energy patterns of two APs, which are synchronized in time and are not overlapped in channels may be easier.

Figure 6:
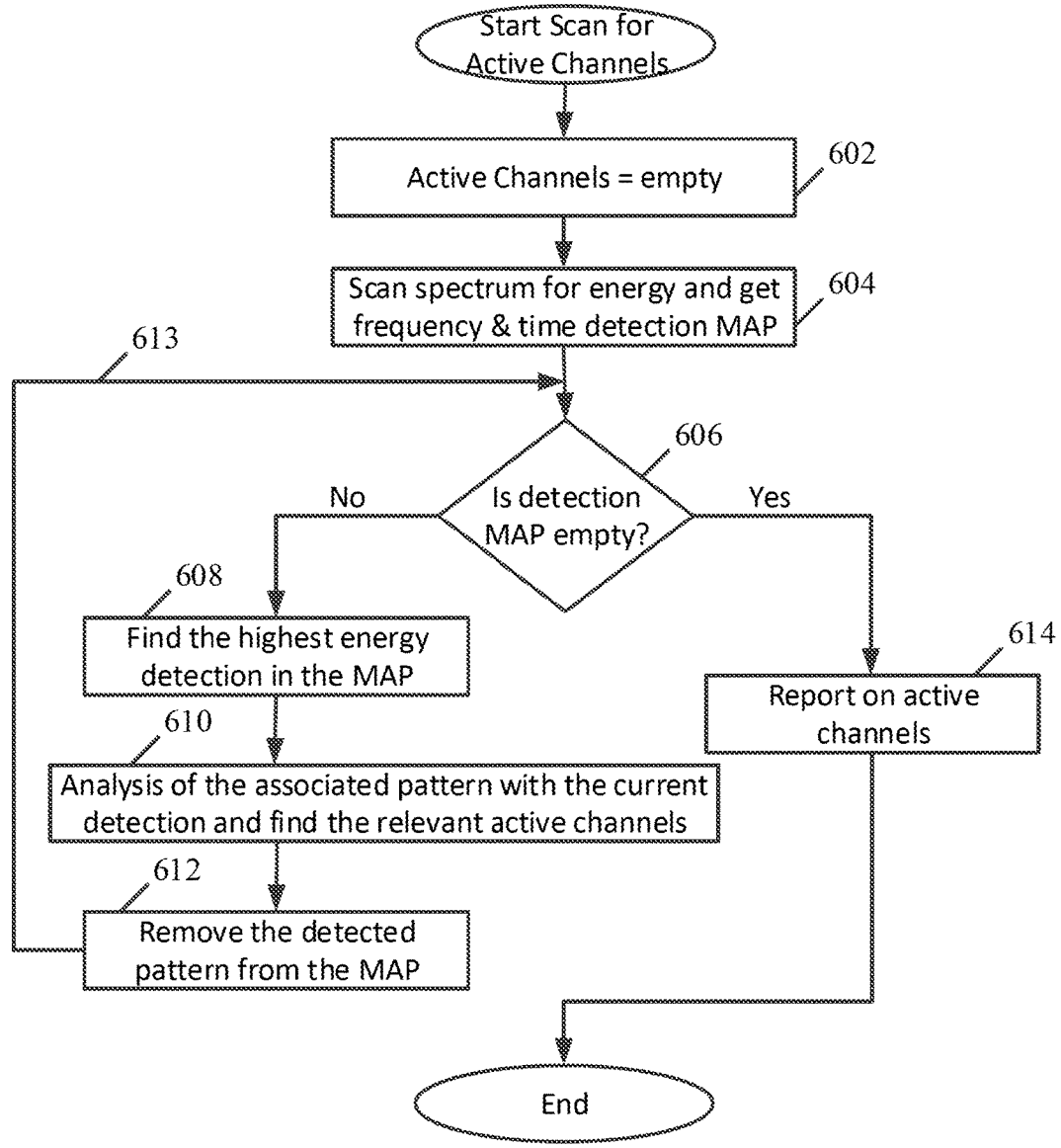
FIG. 6 is a schematic flow-chart illustration of a method of detecting one or more active channels, in accordance with some demonstrative embodiments.

Reference is made to FIG. 6, which schematically illustrates a method of detecting one or more active channels, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1); a controller, e.g., controller 124 (FIG. 1); an energy measurement component, e.g., energy measurement component 132 (FIG. 1); a mapping component, e.g., mapping component 134 (FIG. 1); and/or an activity detector, e.g., activity detector 136 (FIG. 1).

As indicated at block 602, the method may include initializing a list of active channels. For example, activity detector 136 (FIG. 1) may initialize the list of active channels.

As indicated at block 604, the method may include scanning energy on a plurality of channels, and determining a frequency and time detection map. For example, energy measurement component 132 (FIG. 1) may measure the energy over the plurality of channels, and mapping component 134 (FIG. 1) may determine the 2D energy detection map, e.g., as described above.

As indicated at block 606, the method may include determining whether or not the frequency and time detection map is empty. For example, activity detector 136 (FIG. 1) may determine whether or not the 2D energy detection map is empty.

As indicated at block 608, the method may include detecting a highest energy value in the frequency and time detection map. For example, activity detector 136 (FIG. 1) may detect the highest energy value in the 2D energy detection map, e.g., as described above.

As indicated at block 610, the method may include analyzing a detected pattern and determining one or more active channels, based on the detected pattern. For example, activity detector 136 (FIG. 1) may determine the one or more active channels, for example, based on the energy patterns, e.g., as described above.

As indicated at block 612, the method may include removing the detected pattern from the frequency and time detection map. For example, activity detector 136 (FIG. 1) may remove the detected pattern of the active channel from the 2D energy detection map, e.g., as described above.

As indicated by arrow 613, the method may include repeating the operations of blocks 608, 610, and/or 612, for example, with respect to one or more additional energy patterns, for example, as long as the frequency and time detection map is not empty. For example, activity detector 136 (FIG. 1) may repeat the analysis and detection of active channels using the updated 2D energy detection map, e.g., as described above.

As indicated at block 614, the method may include reporting the list of active channels, e.g., when the frequency and time detection map is empty, for example, after removing all the detected patterns. For example, activity detector 136 (FIG. 1) may report the one or more active channels, for example, once the 2D energy detection map is empty.

Figure 7:
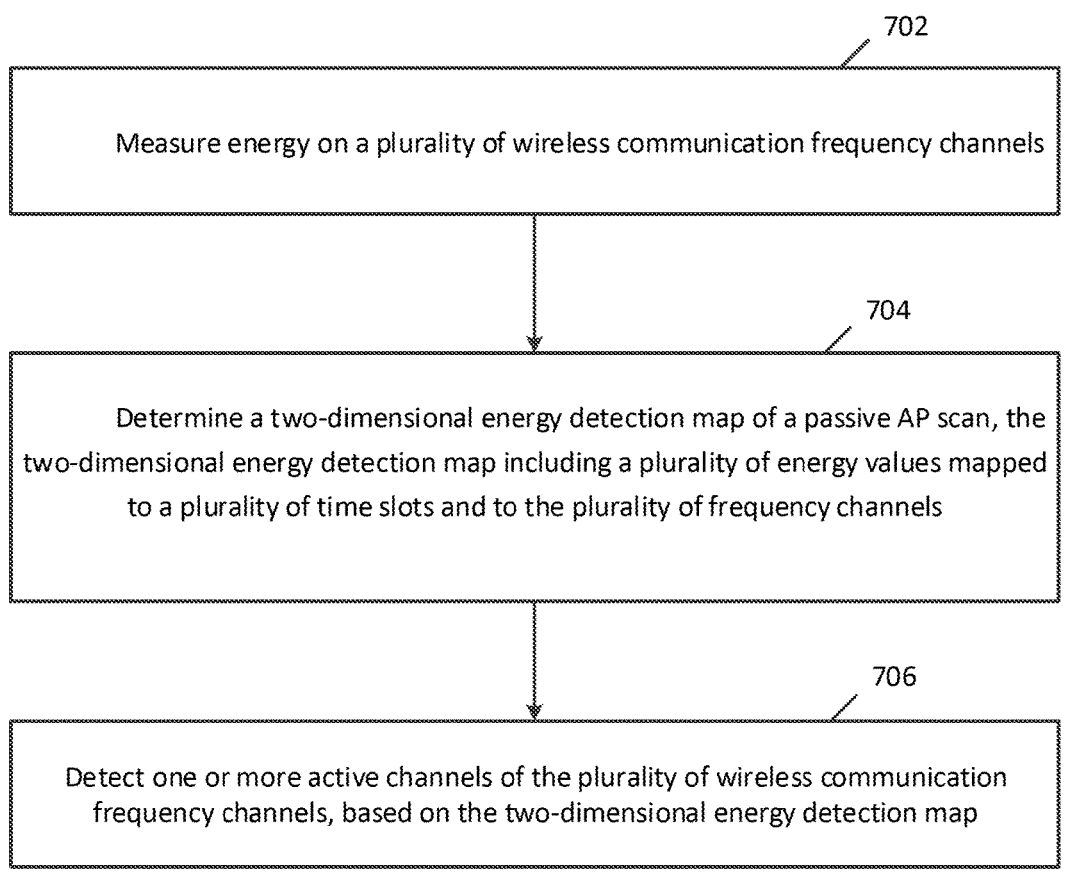
FIG. 7 is a schematic flow-chart illustration of a method of detecting one or more active channels, in accordance with some demonstrative embodiments.

Reference is made to FIG. 7, which schematically illustrates a method of detecting one or more active channels, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1); a controller, e.g., controller 124 (FIG. 1); an energy measurement component, e.g., energy measurement component 132 (FIG. 1); a mapping component, e.g., mapping component 134 (FIG. 1); and/or an activity detector, e.g., activity detector 136 (FIG. 1).

As indicated at block 702, the method may include measuring energy on a plurality of wireless communication frequency channels. For example, energy measurement component 132 (FIG. 1) may measure the energy over a plurality of channels, e.g., as described above.

As indicated at block 704, the method may include determining a two-dimensional energy detection map of a an AP scan, e.g., a passive AP scan, the two-dimensional energy detection map including a plurality of energy values mapped to a plurality of time slots and to the plurality of frequency channels. For example, energy measurement component 132 (FIG. 1) may determine the 2D energy detection map, e.g., as described above.

As indicated at block 706, the method may include detecting one or more active channels of the plurality of wireless communication frequency channels, based on the two-dimensional energy detection map. For example, For example, activity detector 136 (FIG. 1) may detect the one or more active channels of the plurality of wireless communication frequency channels, for example, based on the 2D energy detection map, e.g., as described above.

Figure 8:
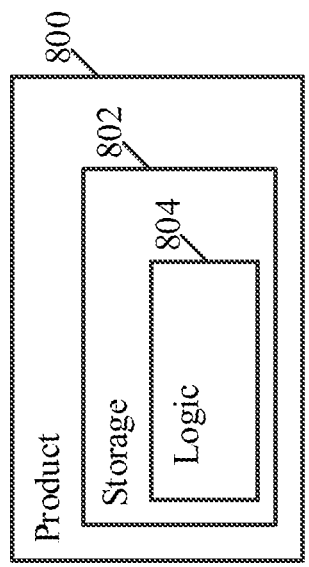
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include one or more tangible computer-readable non-transitory storage media 802, which may include computer-executable instructions, e.g., implemented by logic 804, operable to, when executed by at least one computer processor, enable the at least one computer processor to implement one or more operations at device 102 (FIG. 1), controller 124 (FIG. 1), radio 114 (FIG. 1), energy measurement component 132 (FIG. 1), mapping component 134 (FIG. 1), and/or activity detector 136 (FIG. 1), and/or to perform one or more operations described above with respect to FIGS. 1, 2, 3, 4, 5, 6, and/or 7, and/or one or more operations described herein. The phrase "non-transitory machine-readable medium" is directed to include all computer-readable media, with the sole exception being a transitory propagating signal.

In some demonstrative embodiments, product 800 and/or storage media 802 may include one or more types of computer-readable storage media capable of storing data, including volatile memory, non-volatile memory, removable or non-removable memory, erasable or non-erasable memory, writeable or re-writeable memory, and the like. For example, storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising an energy measurement component comprising circuitry to measure energy on a plurality of wireless communication frequency channels; a mapping component configured to determine a two-dimensional energy detection map of an Access Point (AP) scan, the two-dimensional energy detection map comprising a plurality of energy values mapped to a plurality of time slots and to the plurality of frequency channels; and a channel detector component configured to detect one or more active channels of the plurality of wireless communication frequency channels, based on the two-dimensional energy detection map.

Example 2 includes the subject matter of Example 1, and optionally, wherein an energy value of the plurality of energy values is mapped to a frequency channel and a time slot, and is based on energy measured by the energy measurement component over the frequency channel during the time slot.

Example 3 includes the subject matter of Example 1 or 2, and optionally, wherein the channel detector component is configured to detect one or more energy patterns of one or more respective APs based on the two-dimensional energy detection map, and to determine the one or more active channels based on the one or more energy patterns.

Example 4 includes the subject matter of Example 3, and optionally, wherein the one or more energy patterns comprise at least a filter leakage pattern comprising active energy on an active channel and leakage energy on one or more channels adjacent to the active channel during a same time slot.

Example 5 includes the subject matter of Example 3 or 4, and optionally, wherein the channel detector component is configured to detect an energy pattern comprising two or more energy values, which are mapped to two or more respective frequency channels and to a same time slot, the channel detector component to detect a highest energy value of the two or more energy values and to determine an active channel comprising a channel to which the highest energy value is mapped.

Example 6 includes the subject matter of any one of Examples 3-5, and optionally, wherein the channel detector component is configured to detect an energy pattern comprising two or more energy values, which are mapped to two or more respective time slots and to a same frequency channel, the channel detector component to determine an active channel comprising the same frequency channel.

Example 7 includes the subject matter of any one of Examples 3-6, and optionally, wherein the channel detector component is configured to detect a first energy pattern, and to detect at least one second energy pattern, which partially overlaps with the first energy pattern, by filtering out the first energy pattern from the two-dimensional energy detection map.

Example 8 includes the subject matter of any one of Examples 3-7, and optionally, wherein the channel detector component is configured to detect one or more energy patterns based on a filter pattern of a filter leakage between two or more adjacent frequency channels.

Example 9 includes the subject matter of any one of Examples 3-8, and optionally, wherein the channel detector component is configured to determine whether an AP is not active based on a timing of an active time slot in an energy pattern corresponding to the AP.

Example 10 includes the subject matter of any one of Examples 3-9, and optionally, wherein the one or more energy patterns comprise one or more two-dimensional energy patterns having a time dimension and an energy dimension.

Example 11 includes the subject matter of any one of Examples 1-10, and optionally, wherein the channel detector component is configured to trigger an AP association to associate with an AP over at least one active channel of the one or more active channels.

Example 12 includes the subject matter of any one of Examples 1-11, and optionally, wherein the plurality of wireless communication frequency channels comprise at least about four 20 Megahertz (MHz) channels.

Example 13 includes the subject matter of any one of Examples 1-12, and optionally, comprising one or more antennas, a memory and a processor.

Example 14 includes a wireless communication device comprising one or more antennas; a memory; a processor; a radio to communicate over a plurality of wireless communication frequency channels; an energy measurement component comprising circuitry to measure energy on the plurality of wireless communication frequency channels; a mapping component configured to determine a two-dimensional energy detection map of an Access Point (AP) scan, the two-dimensional energy detection map comprising a plurality of energy values mapped to a plurality of time slots and to the plurality of frequency channels; and a channel detector component configured to detect one or more active channels of the plurality of wireless communication frequency channels, based on the two-dimensional energy detection map.

Example 15 includes the subject matter of Example 14, and optionally, wherein an energy value of the plurality of energy values is mapped to a frequency channel and a time slot, and is based on energy measured by the energy measurement component over the frequency channel during the time slot.

Example 16 includes the subject matter of Example 14 or 15, and optionally, wherein the channel detector component is configured to detect one or more energy patterns of one or more respective APs based on the two-dimensional energy detection map, and to determine the one or more active channels based on the one or more energy patterns.

Example 17 includes the subject matter of Example 16, and optionally, wherein the one or more energy patterns comprise at least a filter leakage pattern comprising active energy on an active channel and leakage energy on one or more channels adjacent to the active channel during a same time slot.

Example 18 includes the subject matter of Example 16 or 17, and optionally, wherein the channel detector component is configured to detect an energy pattern comprising two or more energy values, which are mapped to two or more respective frequency channels and to a same time slot, the channel detector component to detect a highest energy value of the two or more energy values and to determine an active channel comprising a channel to which the highest energy value is mapped.

Example 19 includes the subject matter of any one of Examples 16-18, and optionally, wherein the channel detector component is configured to detect an energy pattern comprising two or more energy values, which are mapped to two or more respective time slots and to a same frequency channel, the channel detector component to determine an active channel comprising the same frequency channel.

Example 20 includes the subject matter of any one of Examples 16-19, and optionally, wherein the channel detector component is configured to detect a first energy pattern, and to detect at least one second energy pattern, which partially overlaps with the first energy pattern, by filtering out the first energy pattern from the two-dimensional energy detection map.

Example 21 includes the subject matter of any one of Examples 16-20, and optionally, wherein the channel detector component is configured to detect one or more energy patterns based on a filter pattern of a filter leakage between two or more adjacent frequency channels.

Example 22 includes the subject matter of any one of Examples 16-21, and optionally, wherein the channel detector component is configured to determine whether an AP is not active based on a timing of an active time slot in an energy pattern corresponding to the AP.

Example 23 includes the subject matter of any one of Examples 16-22, and optionally, wherein the one or more energy patterns comprise one or more two-dimensional energy patterns having a time dimension and an energy dimension.

Example 24 includes the subject matter of any one of Examples 14-23, and optionally, wherein the channel detector component is configured to trigger an AP association to associate with an AP over at least one active channel of the one or more active channels.

Example 25 includes the subject matter of any one of Examples 14-24, and optionally, wherein the plurality of wireless communication frequency channels comprise at least about four 20 Megahertz (MHz) channels.

Example 26 includes a method to be performed at a wireless communication device, the method comprising measuring energy on a plurality of wireless communication frequency channels; determining a two-dimensional energy detection map of an Access Point (AP) scan, the two-dimensional energy detection map comprising a plurality of energy values mapped to a plurality of time slots and to the plurality of frequency channels; and detecting one or more active channels of the plurality of wireless communication frequency channels, based on the two-dimensional energy detection map.

Example 27 includes the subject matter of Example 26, and optionally, wherein an energy value of the plurality of energy values is mapped to a frequency channel and a time slot, and is based on energy measured by the energy measurement component over the frequency channel during the time slot.

Example 28 includes the subject matter of Example 26 or 27, and optionally, comprising detecting one or more energy patterns of one or more respective APs based on the two-dimensional energy detection map, and determining the one or more active channels based on the one or more energy patterns.

Example 29 includes the subject matter of Example 28, and optionally, wherein the one or more energy patterns comprise at least a filter leakage pattern comprising active energy on an active channel and leakage energy on one or more channels adjacent to the active channel during a same time slot.

Example 30 includes the subject matter of Example 28 or 29, and optionally, comprising detecting an energy pattern comprising two or more energy values, which are mapped to two or more respective frequency channels and to a same time slot, detecting a highest energy value of the two or more energy values, and determining an active channel comprising a channel to which the highest energy value is mapped.

Example 31 includes the subject matter of any one of Examples 28-30, and optionally, comprising detecting an energy pattern comprising two or more energy values, which are mapped to two or more respective time slots and to a same frequency channel, and determining an active channel comprising the same frequency channel.

Example 32 includes the subject matter of any one of Examples 28-31, and optionally, comprising detecting a first energy pattern, and detecting at least one second energy pattern, which partially overlaps with the first energy pattern, by filtering out the first energy pattern from the two-dimensional energy detection map.

Example 33 includes the subject matter of any one of Examples 28-32, and optionally, comprising detecting one or more energy patterns based on a filter pattern of a filter leakage between two or more adjacent frequency channels.

Example 34 includes the subject matter of any one of Examples 28-33, and optionally, comprising determining whether an AP is not active based on a timing of an active time slot in an energy pattern corresponding to the AP.

Example 35 includes the subject matter of any one of Examples 28-34, and optionally, wherein the one or more energy patterns comprise one or more two-dimensional energy patterns having a time dimension and an energy dimension.

Example 36 includes the subject matter of any one of Examples 26-35, and optionally, comprising triggering an AP association to associate with an AP over at least one active channel of the one or more active channels.

Example 37 includes the subject matter of any one of Examples 26-36, and optionally, wherein the plurality of wireless communication frequency channels comprise at least about four 20 Megahertz (MHz) channels.

Example 38 includes a product comprising one or more tangible computer-readable non-transitory storage media comprising computer-executable instructions operable to, when executed by at least one computer processor, enable the at least one computer processor to implement operations at a wireless communication device, the operations comprising measuring energy on a plurality of wireless communication frequency channels; determining a two-dimensional energy detection map of an Access Point (AP) scan, the two-dimensional energy detection map comprising a plurality of energy values mapped to a plurality of time slots and to the plurality of frequency channels; and detecting one or more active channels of the plurality of wireless communication frequency channels, based on the two-dimensional energy detection map.

Example 39 includes the subject matter of Example 38, and optionally, wherein an energy value of the plurality of energy values is mapped to a frequency channel and a time slot, and is based on energy measured by the energy measurement component over the frequency channel during the time slot.

Example 40 includes the subject matter of Example 38 or 39, and optionally, wherein the operations comprise detecting one or more energy patterns of one or more respective APs based on the two-dimensional energy detection map, and determining the one or more active channels based on the one or more energy patterns.

Example 41 includes the subject matter of Example 40, and optionally, wherein the one or more energy patterns comprise at least a filter leakage pattern comprising active energy on an active channel and leakage energy on one or more channels adjacent to the active channel during a same time slot.

Example 42 includes the subject matter of Example 40 or 41, and optionally, wherein the operations comprise detecting an energy pattern comprising two or more energy values, which are mapped to two or more respective frequency channels and to a same time slot, detecting a highest energy value of the two or more energy values, and determining an active channel comprising a channel to which the highest energy value is mapped.

Example 43 includes the subject matter of any one of Examples 40-42, and optionally, wherein the operations comprise detecting an energy pattern comprising two or more energy values, which are mapped to two or more respective time slots and to a same frequency channel, and determining an active channel comprising the same frequency channel.

Example 44 includes the subject matter of any one of Examples 40-43, and optionally, wherein the operations comprise detecting a first energy pattern, and detecting at least one second energy pattern, which partially overlaps with the first energy pattern, by filtering out the first energy pattern from the two-dimensional energy detection map.

Example 45 includes the subject matter of any one of Examples 40-44, and optionally, wherein the operations comprise detecting one or more energy patterns based on a filter pattern of a filter leakage between two or more adjacent frequency channels.

Example 46 includes the subject matter of any one of Examples 40-45, and optionally, wherein the operations comprise determining whether an AP is not active based on a timing of an active time slot in an energy pattern corresponding to the AP.

Example 47 includes the subject matter of any one of Examples 40-46, and optionally, wherein the one or more energy patterns comprise one or more two-dimensional energy patterns having a time dimension and an energy dimension.

Example 48 includes the subject matter of any one of Examples 38-47, and optionally, wherein the operations comprise triggering an AP association to associate with an AP over at least one active channel of the one or more active channels.

Example 49 includes the subject matter of any one of Examples 38-48, and optionally, wherein the plurality of wireless communication frequency channels comprise at least about four 20 Megahertz (MHz) channels.

Example 50 includes an apparatus of a wireless communication device, the apparatus comprising means for measuring energy on a plurality of wireless communication frequency channels; means for determining a two-dimensional energy detection map of an Access Point (AP) scan, the two-dimensional energy detection map comprising a plurality of energy values mapped to a plurality of time slots and to the plurality of frequency channels; and means for detecting one or more active channels of the plurality of wireless communication frequency channels, based on the two-dimensional energy detection map.

Example 51 includes the subject matter of Example 50, and optionally, wherein an energy value of the plurality of energy values is mapped to a frequency channel and a time slot, and is based on energy measured by the energy measurement component over the frequency channel during the time slot.

Example 52 includes the subject matter of Example 50 or 51, and optionally, comprising means for detecting one or more energy patterns of one or more respective APs based on the two-dimensional energy detection map, and determining the one or more active channels based on the one or more energy patterns.

Example 53 includes the subject matter of Example 52, and optionally, wherein the one or more energy patterns comprise at least a filter leakage pattern comprising active energy on an active channel and leakage energy on one or more channels adjacent to the active channel during a same time slot.

Example 54 includes the subject matter of Example 52 or 53, and optionally, comprising means for detecting an energy pattern comprising two or more energy values, which are mapped to two or more respective frequency channels and to a same time slot, detecting a highest energy value of the two or more energy values, and determining an active channel comprising a channel to which the highest energy value is mapped.

Example 55 includes the subject matter of any one of Examples 52-54, and optionally, comprising means for detecting an energy pattern comprising two or more energy values, which are mapped to two or more respective time slots and to a same frequency channel, and determining an active channel comprising the same frequency channel.

Example 56 includes the subject matter of any one of Examples 52-55, and optionally, comprising means for detecting a first energy pattern, and detecting at least one second energy pattern, which partially overlaps with the first energy pattern, by filtering out the first energy pattern from the two-dimensional energy detection map.

Example 57 includes the subject matter of any one of Examples 52-56, and optionally, comprising means for detecting one or more energy patterns based on a filter pattern of a filter leakage between two or more adjacent frequency channels.

Example 58 includes the subject matter of any one of Examples 52-57, and optionally, comprising means for determining whether an AP is not active based on a timing of an active time slot in an energy pattern corresponding to the AP.

Example 59 includes the subject matter of any one of Examples 52-58, and optionally, wherein the one or more energy patterns comprise one or more two-dimensional energy patterns having a time dimension and an energy dimension.

Example 60 includes the subject matter of any one of Examples 50-59, and optionally, comprising means for triggering an AP association to associate with an AP over at least one active channel of the one or more active channels.

Example 61 includes the subject matter of any one of Examples 50-60, and optionally, wherein the plurality of wireless communication frequency channels comprise at least about four 20 Megahertz (MHz) channels.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   energy measurement circuitry to measure energy on a plurality of wireless communication frequency channels;
   a mapper configured to determine a two-dimensional energy detection map of an Access Point (AP) scan, the two-dimensional energy detection map comprising a plurality of energy values mapped to a plurality of time slots and to the plurality of frequency channels; and
   a channel detector configured to detect one or more energy patterns of one or more respective APs based on the two-dimensional energy detection map, and to determine one or more active channels of the plurality of wireless communication frequency channels based on the one or more energy patterns.

2. The apparatus of claim 1, wherein an energy value of the plurality of energy values is mapped to a frequency channel and a time slot, and is based on energy measured by the energy measurement circuitry over the frequency channel during the time slot.

3. The apparatus of claim 1, wherein the one or more energy patterns comprise at least a filter leakage pattern comprising active energy on an active channel and leakage energy on one or more channels adjacent to the active channel during a same time slot.

4. The apparatus of claim 1, wherein the channel detector is configured to detect an energy pattern comprising two or more energy values, which are mapped to two or more respective frequency channels and to a same time slot, the channel detector to detect a highest energy value of the two or more energy values and to determine an active channel comprising a channel to which the highest energy value is mapped.

5. The apparatus of claim 1, wherein the channel detector is configured to detect an energy pattern comprising two or more energy values, which are mapped to two or more respective time slots and to a same frequency channel, the channel detector to determine an active channel comprising the same frequency channel.

6. The apparatus of claim 1, wherein the channel detector is configured to detect a first energy pattern, and to detect at least one second energy pattern, which partially overlaps with the first energy pattern, by filtering out the first energy pattern from the two-dimensional energy detection map.

7. The apparatus of claim 1, wherein the channel detector is configured to detect an energy pattern based on a filter pattern of a filter leakage between two or more adjacent frequency channels.

8. The apparatus of claim 1, wherein the channel detector is configured to determine whether an AP is not active based on a timing of an active time slot in an energy pattern corresponding to the AP.

9. The apparatus 1, wherein the one or more energy patterns comprise one or more two-dimensional energy patterns having a time dimension and an energy dimension.

10. The apparatus of claim 1, wherein the channel detector is configured to trigger an AP association to associate with an AP over at least one active channel of the one or more active channels.

11. The apparatus of claim 1, wherein the plurality of wireless communication frequency channels comprise at least four 20 Megahertz (MHz) channels.

12. The apparatus of claim 1 comprising one or more antennas, a memory and a processor.

13. A wireless communication device comprising:
one or more antennas;
a memory;
a processor;
a radio to communicate over a plurality of wireless communication frequency channels;
energy measurement circuitry to measure energy on the plurality of wireless communication frequency channels;
a mapper configured to determine a two-dimensional energy detection map of an Access Point (AP) scan, the two-dimensional energy detection map comprising a plurality of energy values mapped to a plurality of time slots and to the plurality of frequency channels; and
a channel detector configured to detect one or more energy patterns of one or more respective APs based on the two-dimensional energy detection map, and to determine one or more active channels of the plurality of wireless communication frequency channels based on the one or more energy patterns.

14. The wireless communication device of claim 13, wherein an energy value of the plurality of energy values is mapped to a frequency channel and a time slot, and is based on energy measured by the energy measurement circuitry over the frequency channel during the time slot.

15. The wireless communication device of claim 13, wherein the channel detector is configured to trigger an AP association to associate with an AP over at least one active channel of the one or more active channels.

16. A method to be performed at a wireless communication device, the method comprising:
measuring energy on a plurality of wireless communication frequency channels;
determining a two-dimensional energy detection map of an Access Point (AP) scan, the two-dimensional energy detection map comprising a plurality of energy values mapped to a plurality of time slots and to the plurality of frequency channels;
detecting one or more energy patterns of one or more respective APs based on the two-dimensional energy detection map; and
determining one or more active channels of the plurality of wireless communication frequency channels based on the one or more energy patterns.

17. The method of claim 16 comprising triggering an AP association to associate with an AP over at least one active channel of the one or more active channels.

18. A product comprising one or more tangible computer-readable non-transitory storage media comprising computer-executable instructions operable to, when executed by at least one processor, enable the at least one processor to cause a wireless communication device to:
measure energy on a plurality of wireless communication frequency channels;
determine a two-dimensional energy detection map of an Access Point (AP) scan, the two-dimensional energy detection map comprising a plurality of energy values mapped to a plurality of time slots and to the plurality of frequency channels;
detect one or more energy patterns of one or more respective APs based on the two-dimensional energy detection map; and
determine one or more active channels of the plurality of wireless communication frequency channels based on the one or more energy patterns.

19. The product of claim 18, wherein the instructions, when executed, cause the wireless communication device to detect an energy pattern based on a filter pattern of a filter leakage between two or more adjacent frequency channels.

20. The product of claim 18, wherein the one or more energy patterns comprise at least a filter leakage pattern comprising active energy on an active channel and leakage energy on one or more channels adjacent to the active channel during a same time slot.

21. The product of claim 18, wherein the instructions, when executed, cause the wireless communication device to detect an energy pattern comprising two or more energy values, which are mapped to two or more respective frequency channels and to a same time slot, detect a highest energy value of the two or more energy values, and determine an active channel comprising a channel to which the highest energy value is mapped.

22. The product of claim 18, wherein the instructions, when executed, cause the wireless communication device to detect an energy pattern comprising two or more energy values, which are mapped to two or more respective time slots and to a same frequency channel, and determine an active channel comprising the same frequency channel.

23. The product of claim 18, wherein the instructions, when executed, cause the wireless communication device to detect a first energy pattern, and detect at least one second energy pattern, which partially overlaps with the first energy pattern, by filtering out the first energy pattern from the two-dimensional energy detection map.

24. The product of claim 18, wherein the instructions, when executed, cause the wireless communication device to trigger an AP association to associate with an AP over at least one active channel of the one or more active channels.

* * * * *